(12) United States Patent
Gratrix

(10) Patent No.: US 6,820,445 B2
(45) Date of Patent: Nov. 23, 2004

US006820445B2

(54) ATTACHMENT OF OPTICAL ELEMENTS

(75) Inventor: Edward J. Gratrix, Monroe, CT (US)

(73) Assignee: Zygo Corporation, Middlefield, CT (US)

(*) Notice: Subject to any disclaimer, the term of this patent is extended or adjusted under 35 U.S.C. 154(b) by 134 days.

(21) Appl. No.: 10/095,249

(22) Filed: Mar. 11, 2002

(65) Prior Publication Data

US 2002/0136500 A1 Sep. 26, 2002

Related U.S. Application Data

(60) Provisional application No. 60/276,538, filed on Mar. 15, 2001.

(51) Int. Cl.[7] ................................. G02B 6/255
(52) U.S. Cl. .................... 65/387; 65/392; 65/406; 65/407; 65/36; 65/43
(58) Field of Search ............... 65/387, 406, 407, 65/36, 43, 392

(56) References Cited

U.S. PATENT DOCUMENTS

| | | | |
|---|---|---|---|
| 4,892,388 A | * 1/1990 | Taylor | 385/15 |
| 4,961,768 A | * 10/1990 | Djeu | 65/392 |
| 4,962,988 A | 10/1990 | Swann | |
| 5,222,171 A | 6/1993 | Straus | |
| 5,489,321 A | * 2/1996 | Tracy et al. | 65/43 |
| 5,533,158 A | 7/1996 | Han et al. | |
| 5,560,760 A | 10/1996 | Toeppen | |
| 5,693,111 A | * 12/1997 | Kadowaki et al. | 65/43 |
| 6,033,515 A | * 3/2000 | Walters et al. | 156/272.8 |
| 6,143,108 A | 11/2000 | Risen, Jr. et al. | |
| 6,277,776 B1 | 8/2001 | Clare et al. | |
| 6,360,039 B1 | * 3/2002 | Bernard et al. | 385/33 |

FOREIGN PATENT DOCUMENTS

| | | |
|---|---|---|
| EP | 0 457 761 | 12/1994 |
| WO | WO90/09606 | 8/1990 |
| WO | WO97/43117 | 11/1997 |

OTHER PUBLICATIONS

Janina Setina et al., "Early Melting Glass for Assembly of Optical Fiber Into Connectors," SPIE, vol. 2290, pp. 366–377, Jul. 28–29, 1994.

* cited by examiner

Primary Examiner—John Hoffmann
(74) Attorney, Agent, or Firm—Fish & Richardson P.C.

(57) ABSTRACT

The invention features a method for attaching a surface of a first optical element to a surface of a second optical element. The method includes: providing a bonding glass on at least one of the surfaces, wherein the bonding glass is selected to match the refractive indices of the first and second optical elements at the surfaces over a first range of wavelengths and absorb optical energy to a greater extent than that of the optical elements over a second range of wavelengths different from the first range of wavelengths; positioning the surfaces proximate one another; directing optical energy to the bonding glass through at least one of the optical elements at a wavelength in the second range of wavelengths, wherein the optical energy is sufficient to melt the bonding glass without deforming the optical elements; and allowing the melted bonding glass to solidify and fuse the proximately positioned surfaces.

20 Claims, 1 Drawing Sheet

ATTACHMENT OF OPTICAL ELEMENTS

CROSS-REFERENCE TO RELATED APPLICATION

This application claims priority to U.S. provisional patent application No. 60/276,538 filed Mar. 15, 2001, the contents of which are incorporated herein by reference.

BACKGROUND

Optical fibers and components to manipulate optical signals are becoming pervasive elements of modern telecommunications networks.

An optical fiber confines light signals within a narrow inner core that allows the light signals to propagate long distances within the fiber. A single-mode fiber, for example, typically has an inner core diameter on the order of eight microns. At some point, such optical signals exit the fiber for downstream processing. Thus, the light signals are "coupled" from the optical fiber to subsequent optical components, e.g., lenses, switches, detectors, mirror arrays, amplifiers, etc. Similarly, light signals are coupled into optical fibers from similar such components as well as sources. To facilitate such coupling, focusing elements such as a lens (e.g., a gradient index lens or ball lens) can be positioned relative to the optical fiber to collimate light emerging from, or focus light into, the narrow fiber core. Optimizing the efficiency of such coupling typically require precise positioning and alignment of the respective optical components. This is true not only of optical fibers and coupling lenses, but optical components in general.

SUMMARY

In general, in one aspect, the invention features a method for attaching a surface of a first optical element to a surface of a second optical element. The method includes: providing a bonding glass on at least one of the surfaces, wherein the bonding glass is selected to match the refractive indices of the first and second optical elements at the surfaces over a first range of wavelengths and absorb optical energy to a greater extent than that of the optical elements over a second range of wavelengths different from the first range of wavelengths; positioning the surfaces proximate one another; directing optical energy to the bonding glass through at least one of the optical elements at a wavelength in the second range of wavelengths, wherein the optical energy is sufficient to melt the bonding glass without deforming the optical elements; and allowing the melted bonding glass to solidify and fuse the proximately positioned surfaces.

In general, in another aspect, the invention features an optical assembly including: a first optical component having a first surface; a second optical component having a second surface; and a bonding glass fusing the first surface to the second surface, wherein the bonding glass is selected to match the refractive indices of the first and second optical elements at the surfaces over a first range of wavelengths, and wherein the bonding glass is selected to absorb optical energy to a greater extent than that of the optical elements over a second range of wavelengths different from the first range of wavelengths such that optical energy directed to the bonding glass through at least one of the optical elements at a wavelength in the second range of wavelengths can melt the bonding glass without deforming the optical elements.

Other aspects, features, and advantages of the invention will be apparent from the following detailed description and from the claims.

DETAILED DESCRIPTION

The invention features a monolithic optical assembly in which a first optical element (e.g., an optical fiber) is fused to a second optical element (e.g., a coupling lens) by a bonding glass. The monolithic structure is rugged and maintains the alignment between the first and second elements following their fusion. The invention also features a method for attaching the two optical elements into the monolithic assembly by melting the bonding glass.

The bonding glass is selected to match the refractive indices of the first and second elements over a desired range of wavelengths ("the first wavelength range"). For example, the desired wavelength range may be in the near infrared (NIR) around about 1.3 to about 1.6 microns, which is typical of transmission wavelengths for optical telecommunications. When such index matching is achieved, there is no back reflection of light signals in the desired wavelength range at the bonding glass interface. Thus, for example, when one of the elements is an optical fiber, it is not necessary to lap the exposed face of the fiber at an angle to prevent collinear back reflection from that face.

On the other hand, in a second wavelength range (e.g., in ultraviolet region) the bonding glass is selected to absorb optical radiation more strongly than either of the first or second optical elements. Moreover, the bonding glass can be selected to have a low melt temperature.

Thus, the two elements can be attached to one another by applying the bonding glass as a thin film to one or both of the optical elements, bringing the two elements close to one another at the thin film(s), and using the thin film to fuse the elements together. Laser light in the second wavelength range (e.g., UV light) is transmitted through at least one of the optical elements to the bonding glass, which absorbs that laser light and melts. When the laser light is turned off, the bonding glass solidifies, thereby bonding the two elements together into the monolithic assembly Before the bonding glass is melted and then solidified, the alignment of the two elements can be adjusted based on the throughput efficiency, back reflection reduction, pointing or other optical evaluation technique which is directed through the elements at a wavelength in the first wavelength range (e.g., near-IR light).

In preferred embodiments, the bonding glass is inorganic. In other words, it does not include organic components such as epoxy, which may cause outgasing concerns and/or have low damage thresholds.

In the following subsequent description, we describe attaching a micro-optic coupling lens to an optical fiber to make a monolithic assembly. The teachings herein can also be extended to attaching any other micro-optic component to an optical fiber, or more generally, to attaching any one optical element to any other optical element, including, for example, fiber arrays and lens arrays.

Figure 1A:
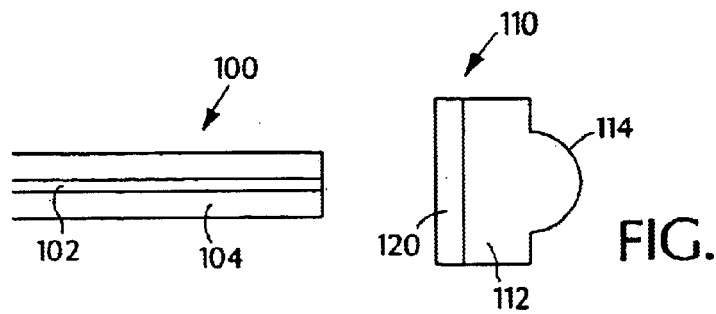
FIGS. 1A, 1B, 1C, and 1D illustrating step for attaching an optical fiber to a micro-optic component to form an integrated optical assembly.

Referring to FIG. 1A, an optical fiber 100 includes an inner core 102 and an outside cladding 104. Typically, core 102 is made from fused silica. Furthermore, for single mode optical fibers, inner core 102 has a diameter on the order of one to two microns. Optical fiber 100 is to be fused with a microlens 110 having a plano-surface 112 and a curved surface 114 to form a micro-optic assembly. Microlens 110 is also typically made of fused silica.

Plano surface 112 includes a thin film layer of bonding glass 120 to facilitate the fusion of the fiber 100 and lens 110. The bonding glass can be formed on surface 112 by sputtering, thermal deposition, sol-gel deposition, implantation, ion exchange or diffusion or any other common thin film deposition technique. Bonding glass 120 is selected to form a low-melt temperature, glass interface that matches the refractive indices of fiber core 102 and lens 110 over a range of wavelengths ("the first range of wavelengths") that includes those wavelengths desired for transmission through fiber 100 and lens 110. For example, the first wavelength range can include wavelengths in the near infrared, e.g., around about 1.3 and/or around about 1.55 microns, which is common for telecommunications applications.

Bonding glass 120 is also selected to strongly absorb light in a second wavelength range for which fiber core 102 and lens 110 absorb less strongly, if at all. Thus, when light in the second wavelength range is transmitted through optical fiber 100 and into lens 110, only bonding glass 120 substantially absorbs that light. For example, when fiber core 102 and lens 110 are made from fused silica, the second wavelength range may be in the ultraviolet (e.g., below about 400 nm).

Furthermore, bonding glass is selected to have a low-melt temperature, so that it melts and fiber core 102 and lens 110 do not melt or deform, when a sufficient amount of light in the second wavelength range is transmitted to bonding glass 120. In preferred embodiments, the bonding glass does not include any organic components, which tend to cause low damage thresholds in the ultraviolet region. Organic components can also cause environmental concerns by outgasing.

Figure 1B:
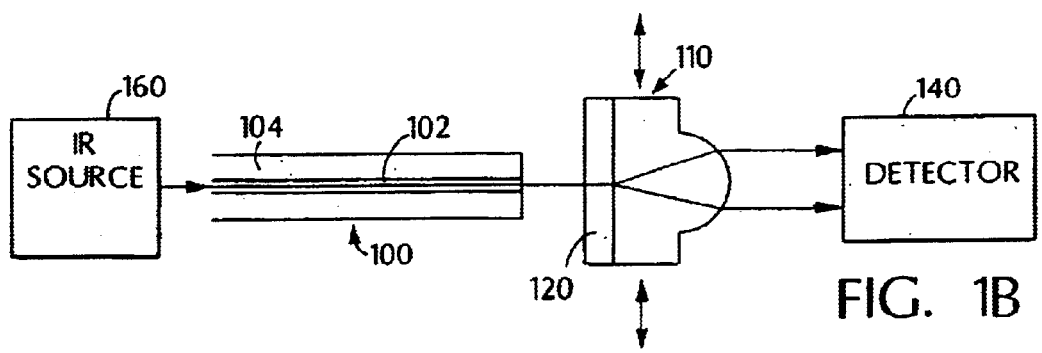

Referring to FIG. 1B, fiber 100 and lens 110 are brought into contact with one another at bonding glass 120, or brought near enough to one another to fuse when bonding glass 120 is melted. A source 130 of laser light at a wavelength in the first wavelength range directs light into fiber core 102 and through to lens 110. Because bonding glass is selected to index match wavelengths in the first wavelength range, the laser light travels from fiber 100 into lens 110 with substantially no reflections. Whether or not that light emerges from lens 110 collimated, however, depends on the relative transverse positions of fiber 100 and lens 110. A detector 140 can be positioned to monitor the collimation of the light, e.g., near-IR light, emerging from lens 110. Based on the detector response, the transverse positions of fiber 100 and lens 110 can be adjusted to optimize such collimation. For example, fiber 100 and lens 110 can each be positioned in an adjustable chuck whose position is adjusted in response to the detector measurement to better align fiber 100 and lens 110 with one another. In alternative embodiments, the positions of source 130 and detector 140 can be reversed so that fiber 100 and lens 110 are aligned with one another based on the efficiency of light coupled into fiber core 102 from lens 110. In either case, the alignment can be performed by a user or under servo control in an automated fiber alignment scheme.

Figure 1C:
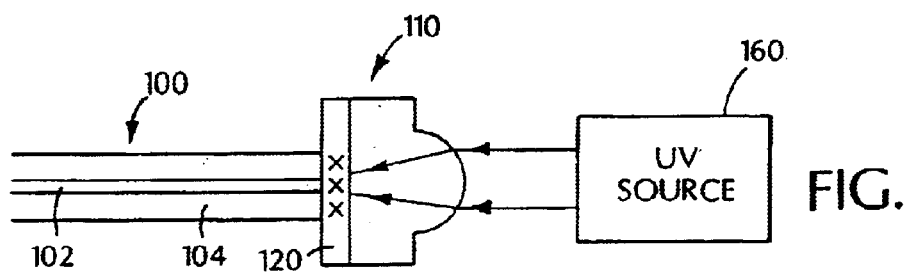

Referring to FIG. 1C, after fiber 100 and lens 110 are aligned with one another, a second laser source 160 of light at a wavelength in the second wavelength range directs light into lens 110 and onto bonding glass 120. Because that light is in the second wavelength range, bonding glass 120 absorbs that light and melts. Moreover, because fiber 100 and lens 110 are aligned with one another, lens 110 focuses that light directly onto the region of bonding glass 120 adjacent fiber core 102, thereby increasing the light intensity at that region to better melt the bonding glass and ultimately provide a bond between the fiber core (e.g., a silica fiber core) and the lens (e.g., a silica lens). In other embodiments, the light used to melt the bonding glass may be directed to bonding glass 120 through fiber 100 rather than, or in addition to, through lens 110. In such cases, the light energy from fiber 100 is necessarily directed to the region of bonding glass 120 adjacent fiber core 102.

Moreover, in preferred embodiments, the second wavelength range is selected to be one where fiber core 102 and lens 110 are substantially transparent. Thus, optical energy from source 160 is only absorbed by bonding glass 120 and not elsewhere in the optical assembly. More generally, however, the second wavelength range is selected such that even if fiber core 102 and lens 110 absorb optical energy in that range, bonding glass 120 will melt in response to that optical energy before fiber core 102 and lens 110 deform.

Figure 1D:
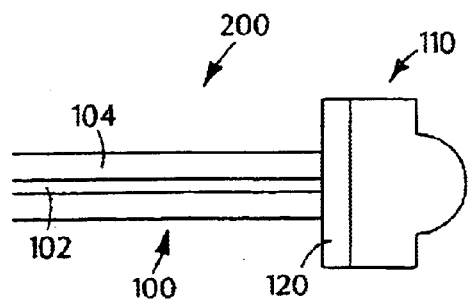

After source 160 has delivered an amount of optical energy sufficient to melt the bonding glass between fiber core 102 and lens 110, it is turned off. Referring to FIG. 1D, bonding glass 120 resolidifies to attach fiber core 102 to lens 110. As is necessary, source 140 and detector 150 (shown in FIG. 1B) can be used to further optimize the alignment of fiber core 102 and lens 110 during the melting and resolidifying of the bonding glass. The resulting optical assembly 200 is an integrated structure having an optimized alignment and a substantially uniform refractive index for transmission wavelengths in the first wavelength range, i.e., the desired transmission wavelengths for the assembly.

Accordingly, the method, and particularly, the selection of bonding glass 120 and melting light source 160, allow energy to be absorbed in the optical assembly primarily at the interface where the elements need to be attached, and not elsewhere. Thus, it permits alignment of the fiber to the lens with substantially no preheating and minimizes the chance of heat-induced asymmetric temperature gradients that may result in misalignments before solidification and fusing.

As described above, the method can be extended to optical components other than an optical fiber and a coupling lens. Moreover, the surfaces of the optical components to be attached need not be flat. For example, the surfaces could be convex or concave or wedged provided that they can be brought into sufficient proximity to one another to be bonded by the bonding glass after it is melted and resolidified. Furthermore, the surfaces to be attached could include surface features or markings to guide their alignment. Also, in additional embodiments, the bonding glass can be applied to one surface, the other surface, of both surfaces. For example, referring again to FIG. 1A, the bonding glass could be applied to the face of fiber core 102 in addition to, or instead of, piano surface 112 of lens 110.

In many embodiments, the optical components to be attached (e.g., optical fiber 100 and lens 110) will be made from fused silica. For such embodiments, particularly suitable bonding glasses are: PFK 85 and CaFK95, available from SUMITA OPTICAL GLASS, INC. (4-7-25, Haigaya, Urawa, Saitama 338-8565, Japan); FK-3 and FK-54, available from Schott Glass Technologies (400 York Ave, Duryea Pa. 18642); FCD-100 and FCD-10, available from HOYA CORPORATION (2-7-5 Naka-Ochiai, Shinjuku-ku, Tokyo 161-8525 Japan); and FSL-3, SFPL-53 and SFPL-52, available from Ohara Glass (15-30 Oyama 1-Chome, agamihara-Shi Kanagawa, 229-1186, Japan). Also, fluorine-containing borophosphate glass may be suitable. See, e.g., "Easily melting glass for assembly of optical fiber into connectors", SPIE Vol. 2290, pp 366-377, 1994.

Such materials have a refractive index that matches or very closely matches that of fused silica at wavelengths used for optical fiber communications (i.e., near-IR wavelengths) and transmits at these wavelengths with little or no attenuation. They also absorb UV wavelengths below 400 nm more strongly than fused silica and have a melt temperature less than that of fused silica. Thus, when exposed to a sufficient amount of UV radiation, they melt, and the fused silica components are substantially unaffected. A suitable source for such UV radiation is a frequency-doubled, Argon ion laser, which would operate at about 244 nm.

It is understood that while the invention has been described in conjunction with the detailed description thereof, the foregoing description is intended to illustrate and not limit the scope of the invention, which is defined by the scope of the appended claims.

Other aspects, advantages, and modifications are within the scope of the following claims.

What is claimed is:

1. A method for attaching a surface of a first optical element to a surface of a second optical element, the method comprising:

providing a bonding glass on at least one of the surfaces;

positioning the surfaces proximate one another;

directing optical energy to the bonding glass through at least one of the optical elements, wherein the optical energy is sufficient to melt the bonding glass without deforming the optical elements; and allowing the melted bonding glass to solidify and fuse the proximately positioned surfaces, wherein at least one of the optical elements is selected from a group consisting of an optical fiber and a lens.

2. The method of claim 1, wherein positioning the surfaces proximate one another comprises-directing optical radiation through the first optical element and into the second optical element through the surfaces and adjusting positions of the optical elements to optimize the coupling efficiency of the optical radiation directed through the first optical element and into the second optical element.

3. The method of claim 2, wherein the adjustment of the positions of the optical elements is automated in response to a measurement indicative of the coupling efficiency.

4. The method of claim 1, wherein a source for the optical energy directed to the bonding glass comprises a frequency-doubled Argon ion laser.

5. The method of claim 1, wherein the first and second optical components comprise fused silica.

6. The method of claim 1, wherein one of the optical elements is an optical fiber.

7. The method of claim 6, where the other of the optical elements is a lens.

8. The method of claim 7, wherein the optical fiber and lens comprise fused silica.

9. The method of claim 1, where one of the optical elements is a lens.

10. The method of claim 9, wherein the optical energy is directed through the lens and focused by the lens onto the bonding glass.

11. The method of claim 1, wherein the bonding glass matches the refractive indices of the optical elements over a first range of wavelengths.

12. A method for attaching a surface of a first optical element to a surface of a second optical element, the method comprising:

providing a bonding glass on at least one of the surfaces;

positioning the surfaces proximate one another;

directing optical energy in a second wavelength range to the bonding glass through at least one of the optical elements, wherein the optical energy is sufficient to melt the bonding glass without deforming the optical elements; and allowing the melted bonding glass to solidify and fuse the proximately positioned surfaces, wherein the second wavelength range is in the ultraviolet (UV).

13. The method of claim 12, wherein every wavelength in the second wavelength range is less than about 400 nm.

14. A method for attaching a surface of a first fused silica optical element to a surface of a second fused silica optical element, the method comprising:

providing a bonding glass on at least one of the surfaces;

positioning the surfaces proximate one another;

directing optical energy to the bonding glass through at least one of the optical elements at a wavelength in the ultraviolet region, wherein the optical energy is sufficient to melt the bonding glass without deforming the optical elements; and allowing the melted bonding glass to solidify and fuse the proximately positioned surfaces.

15. The method of claim 14, wherein a source for the optical energy directed to the bonding glass comprises a frequency-doubled Argon ion laser.

16. A method for attaching a surface of a first optical element to a surface of a second optical element, the method comprising:

providing a bonding glass on at least one of the surfaces, wherein the bonding glass matches the refractive indices of the optical elements in a first range of wavelengths and absorbs optical energy in a second range of wavelengths to a greater extent than any absorption by the optical elements in the second range of wavelengths;

positioning the surfaces proximate one another;

directing optical energy to the bonding glass through at least one of the optical elements at a wavelength in the second range of wavelengths, wherein the optical energy is sufficient to melt the bonding glass without deforming the optical elements; and allowing the melted bonding glass to solidify and fuse the proximately positioned surfaces, wherein at least one of the optical elements is selected from a group consisting of a fiber and a lens.

17. The method of claim 16, wherein the first wavelength range is in the near-infrared (NIR).

18. The method of claim 17, wherein the first wavelength range is in the range of about 1.3 microns to about 1.6 microns.

19. The method of claim 16, wherein the first wavelength range is in the near infrared and the second wavelength range is in the ultraviolet.

20. The method of claim 16, wherein the bonding glass is substantially transparent over the first range of wavelengths.

* * * * *